Patented May 29, 1923.

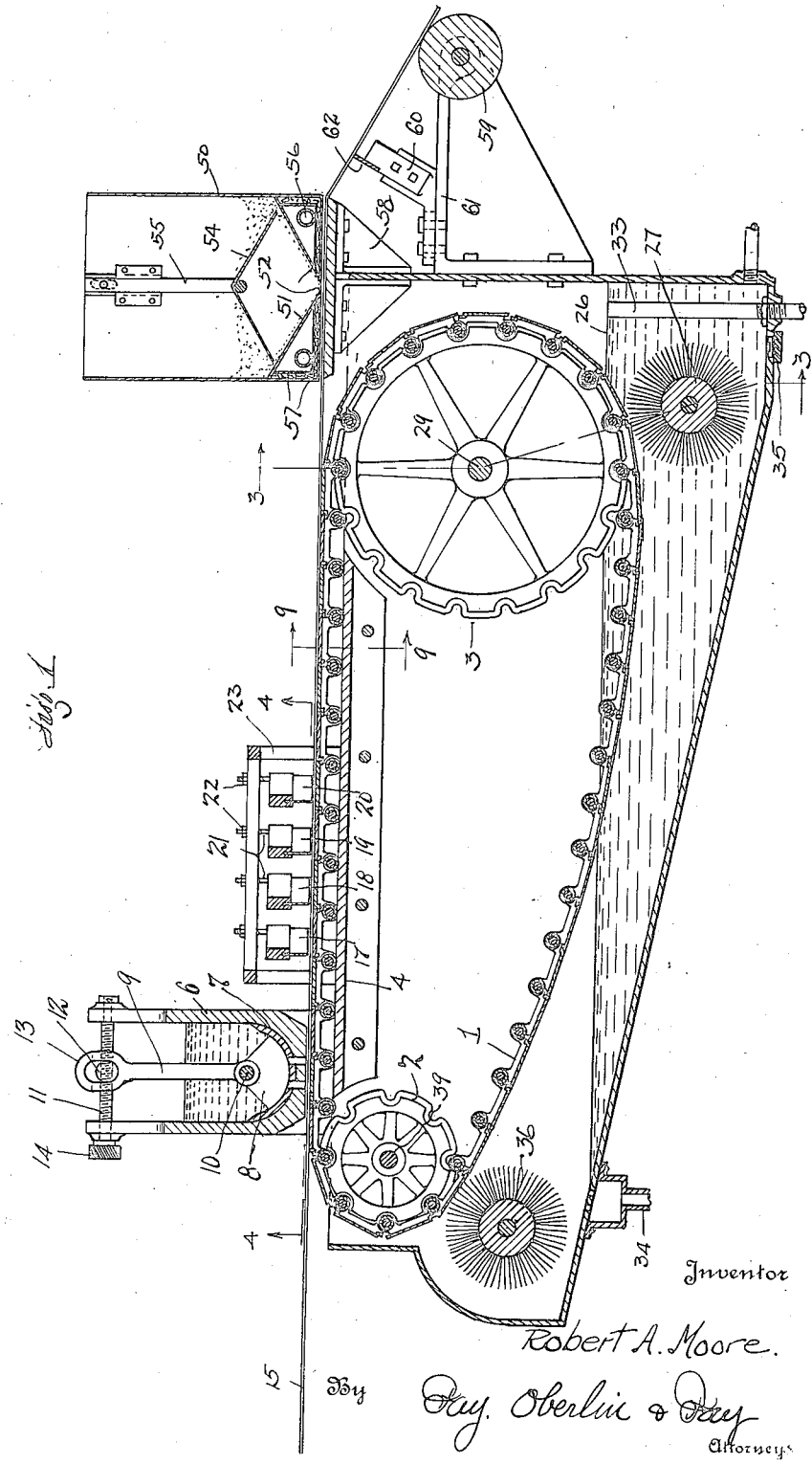

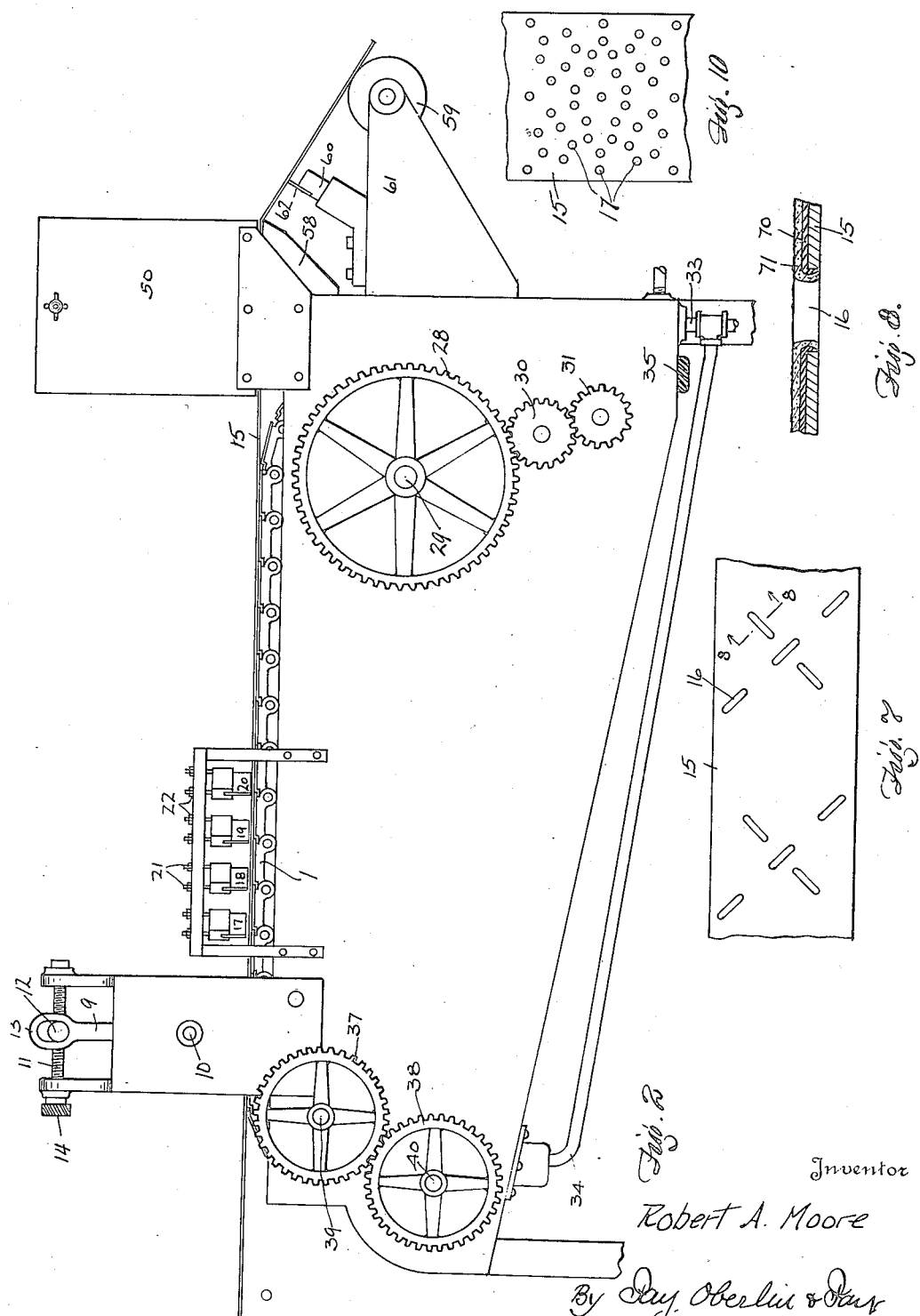

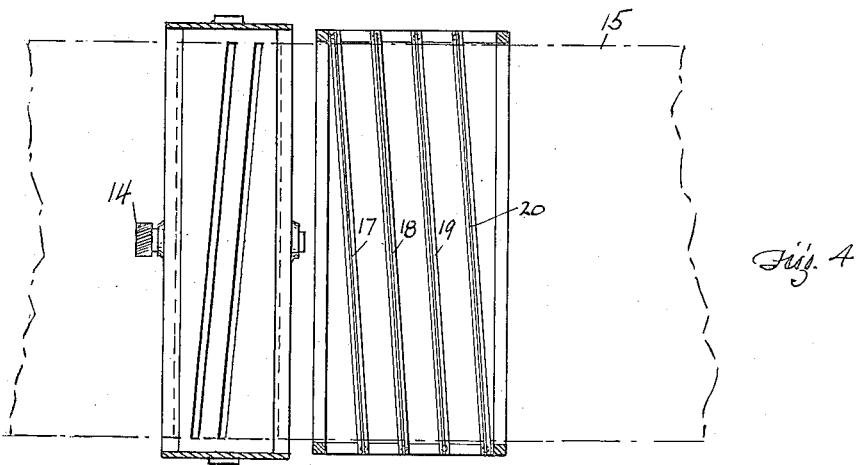
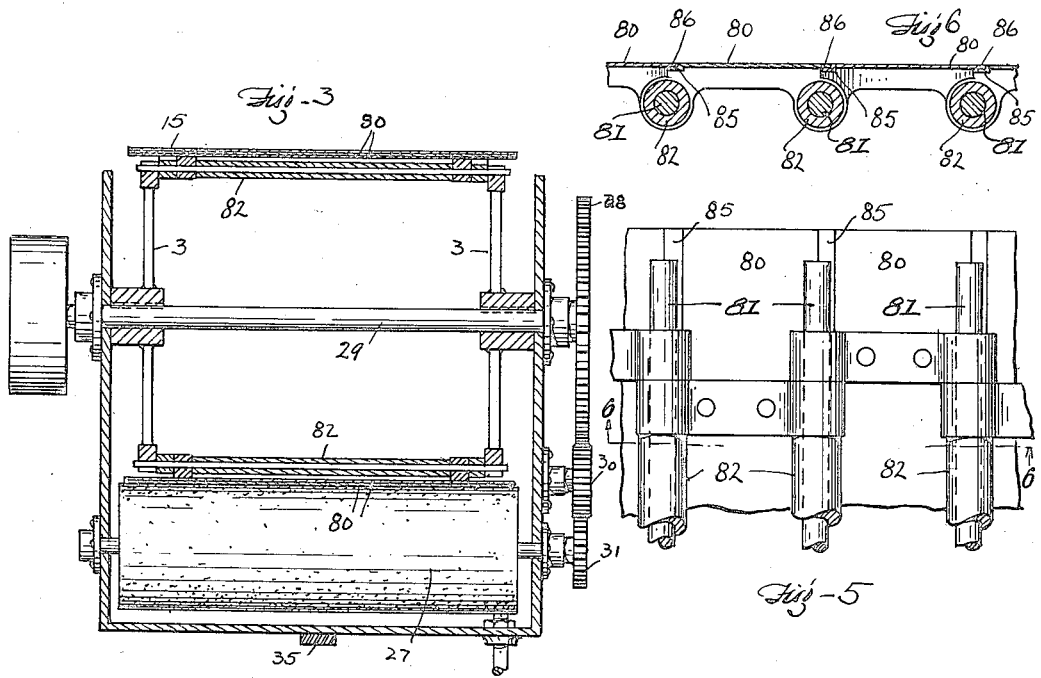

1,456,561

UNITED STATES PATENT OFFICE.

ROBERT A. MOORE, OF CLEVELAND, OHIO.

APPARATUS FOR MAKING ABRASIVE BELTS.

Application filed April 20, 1920. Serial No. 375,259.

*To all whom it may concern:*

Be it known that I, ROBERT A. MOORE, a citizen of the United States, and a resident of Cleveland, county of Cuyahoga, and State of Ohio, have invented a new and useful Improvement in Apparatus for Making Abrasive Belts, of which the following is a specification, the principle of the invention being herein explained and the best mode in which I have contemplated applying that principle, so as to distinguish it from other inventions.

The present invention, relating, as indicated, to an apparatus for manufacturing abrasive belts, is particularly concerned with a flexible abrasive belt such as is used in grinding and smoothing surfaces of wood and metal articles for which there are an infinite number of uses. I have found that a flexible and abrasive belt provided with a series of perforations extending directly through the belt has a much longer life and is capable of a much faster cutting speed than those now in use, or than those which are merely provided with a series of recesses which do not extend entirely through the belt has a much longer life and is capable of a much faster cutting speed than those now in use, or than those which are merely provided with a series of recesses which do not extend entirely through the belt body. Such a belt and the apparatus for maufacturing same are the subject matter of the present invention. To the accomplishment of the foregoing and related ends, said invention, then, consists of the means hereinafter fully described and particularly pointed out in the claims.

The annexed drawing and the following description set forth in detail one method and one product exemplifying my invention, such disclosed procedure and product constituting, however, but one of various applications of the principle of my invention.

Fig. 1 is a longitudinal section through one form of my improved apparatus; Fig. 2 is a similar view, but showing a side elevation of the apparatus; Fig. 3 is a transverse section on the line 3—3, Fig. 1; Fig. 4 is a bottom plan view of the distributing or scraping means shown in Fig. 1, Fig. 5 is a bottom plan view of a portion of the endless carrying belt; Fig. 6 is a section on the line 6—6, in Fig. 5; Fig. 7 is a plan view of the finished belt; Fig. 8 is a section on the line 8—8, in Fig. 7; Fig. 9 is a transverse section on the line 9—9, Fig. 1; and Fig. 10 is a plan view of a portion of a belt provided with openings of a different shape and arrangement from those in Fig. 7.

In Fig. 1 I have shown an endless carrier belt 1, which is mounted upon, and driven by suitably formed sprockets 2 and 3, which may be actuated by any suitable means. The sprockets are so arranged that the upper portion of the belt is carried in a single plane and in a horizontal position between the upper edges of the two sprockets 2 and 3, and over a supporting table 4, upon which the rollers mounted at the knuckles of the belt are adapted to roll in order to present a smooth unyielding upper surface for this portion of the belt.

Mounted adjacent one end of the belt already described is a binder-discharge mechanism in the form of a chamber 6 provided with discharge ports 7 in its bottom, which are controlled by means of a valve member 8 formed to conform to the bottom surface of the chamber 6, and operated by means of an arm 9 pivoted about an axis 10. The position of the valve 8 and the arm 9 is controlled by means of a threaded member 11 extending from side to side of the chamber 6, and provided with an engaging yoke and pin 12, and pin working in a slot 13 formed in the upper end of the member 9. The adjacent element 11 carries an adjusting nut 14 upon one end exteriorly of the chamber 6, and a very accurate and sensitive attachment may be given to the position of the valve 8 by turning the nut 14 in either direction. This chamber is adapted to contain a binder, such, for example, as a liquid glue, which is fed through the port 7 onto the surface of a prepared belt body 15. This belt body 15 may be of any suitable material, cloth or paper usually being used, and is previously provided with a series of slots or openings 16, which extend entirely through the belt body, as shown in Figs. 7 and 8.

The belt 1 is made up of a series of plates 80 (see Figs. 6 and 9) pivotally mounted on studs 81 which also carry sleeves 82. The latter rotate and roll on the table 4, and since they are in the same plane the plates 80 present a perfectly level and smooth supporting surface for the belt 15. The plates 80 are formed with interengaging ends 85 and 86, which allow the plates to pivot when necessary to pass over the sprockets 2 and 3.

The belt body 15 is passed on to the upper surface of the carrier belt 1 and directly beneath the discharge ports 7 in the binder-containing chamber. These two ports 7, as shown in Fig. 4, extend the full width of the carrier belt and lie at an acute angle to the direction of movement of the same, and are adapted to continuously feed a thin stream of glue or other binder entirely across the upper surface of the belt body 15.

Mounted beyond the binder-containing chamber is a distributing mechanism for evenly distributing the binder over the entire surface of the belt body. This mechanism comprises a series of thin flexible steel blades 17, 18, 19 and 20, all of which are adjustably mounted by bolts 21 and screws 22 in a supporting framework or structure 23, so that the distance between the lower edges of the blades and the upper surface of the belt body can be accurately gauged to properly distribute the material thereover. The blades 17, 18, 19 and 20 are mounted at approximately the same angle as the discharge ports 7, but are inclined in the opposite direction, and such binder as is scraped from off the surface of the belt body is collected at one side of the carrier belt in a trough 24 and may then be returned to the binder chamber. The several distributing blades will be set so that the first blade to operate on the belt surface is at the maximum distance therefrom, while the last blade is set to remove all material except the exact amount which is desired to remain on the blade surface.

During the action of spreading the glue over the surface of the blade some glue will of course work through the perforations 16 in the belt onto the plates which make up the carrier belt 1. In order to remove the glue from these plates I provide a rotary brush 27, which is mounted below the liquid level in a washing tank 26 which surrounds the entire carrier belt, as shown in Figs. 1 and 2. This brush 26 is operated from a driving gear 28 carried on a shaft 29, which also carries the sprocket 3 through gears 30 and 31. In this way the brush is rotated against the travel of the carrier belt 1 and a suitable cleaning solution is maintained in the tank 26 to assist the brush in brushing any glue from off the surface of the plates which make up the belt. It should be remembered that the glue adhering to the plates of the belt is still in a liquid condition, and it can be readily removed by the means described.

The cleaning solution used in the tank 26 is renewed constantly through a supply conduit 33 and a discharge conduit 34, and is maintained in a heated condition. A removable plug 35 in the bottom of the tank 27 allows all of the solution to be drawn off at intervals to clean the tank, and also to remove any glue which is deposited in the bottom. A second brush 36 is mounted above the level of the liquid in the tank and acts to brush the plates of the belt after they have left the cleaning solution. This brush is operated by means of gears 37 and 38, of which the gear 37 is attached to the shaft 39 on which the sprocket 2 is mounted, while the brush 38 is attached to the shaft 40 which carries the brush 36. Any liquid remaining on the outer surface of the plates is removed by the action of the brush 36, and as the liquid is hot the air currents produced by the rotation of this brush, together with the removal of practically all liquid from the plates, serves to bring the plates into their upper and operative position in practically a dry condition. After the abrasive has been distributed over the surface of the belt body the belt is carried along on the upper flattened surface of the carrier belt and is then brought beneath an abrasive distributing tank 50. This tank is provided with sloping sides 51, the lower edges of which define a discharge port or opening 52 extending the entire width of the belt body, while other sloping members 54 are carried on a vertically adjustable slide 55 and act as baffle plates to cause material to fit into the top of this tank or hopper 50 to slide down and strike the inclined surfaces 51 at any level. This adjustment also allows for varying the opening between the plates 54 and the surfaces 51, and in this way controls the rate of feed of abrasive material. In the three-sided chambers formed in the lower corners of the hopper 50 are provided heating devices, here shown in the form of gas burners 56 for heating the inclined plates 51, and in this way heating the abrasive material as it passes down for distribution over the binder on the surface of the belt body. In order to prevent conduction of heat from these chambers directly to the belt body the vertical and horizontal walls are insulated with non-conducting material such as asbestos 57.

During its passage beneath the abrasive hopper the belt body is supported on a table 58, and upon leaving this table it is carried over a roller 59 and then led to a suitable drying chamber for drying the binder and setting the abrasive in the same. Interposed between the table 58 and the roller 59 is a tool-carrying slide 60 which is adjustably mounted for longitudinal movement along a support 61, and is provided with one or more scraper knives 62 which lie in contact with the under or reverse surface of the belt body.

The operation of my improved apparatus will be readily understood from the foregoing description. A prepared belt body provided with a series of openings, such as is shown in Fig. 7, is passed beneath the binder-containing chamber which discharges a thin sheet of binder over the surface of the belt body. This binder is then distributed and leveled to the desired thickness on the belt by means of the distributing members 17, 18, 19 and 20, after which the abrasive is applied in a hot condition, the heat causing the abrasive to hasten the setting of the binder and prevent an undue amount of binder and abrasive from working through the openings of the belt on to the reverse surface. The reverse surface of the belt is then scraped by the passage of the belt over the knife 62, and any binder and abrasive which have worked through the openings in the belt are removed. The belt is then finished except for drying, which may be carried out in any suitable mechanism, such as is usually employed for this purpose.

In Fig. 8 I have shown a section through the belt taken to show the condition of the edges of one of the openings. The belt body 15 is shown with the binder 70 extending over the upper surface of the belt and down the vertical edges or sides of the opening 16. The abrasive 71 also extends down the vertical sides of the opening, as it of course is caught by the adhesive binder at these points, and is held, and in this way the belt is provided with a series of openings which allow the belt to clear itself of the material removed from the surface being operated upon and also give the belt a large number of cutting edges with abrasive extending down the surface of the edge. In tests on ordinary belts, belts provided with grooves extending entirely across the surface, and belts such as are shown in Figs. 7 and 8, the latter has shown a life and cutting speed of from two to three times the life of the ordinary belt, and about 25 per cent more life and cutting speed than a belt provided with grooves. In Fig. 10 I have shown a belt 15 with a series of openings etc. These openings are circular and are so arranged that they cover the entire width of the belt, that is, they are so scattered over the belt surface that no point on an article being surfaced would miss all of the holes on the belt. Each hole has its edges covered with abrasive as does the hole 16 in the belt of Fig. 8 so that the cutting action of these edges on the material is unaltered, as is also the "clearance" action of openings.

Other forms may be employed embodying the features of my invention instead of the one here explained, change being made in the form or construction, provided the elements stated by any of the following claims or the equivalent of such stated elements be employed, whether produced by my preferred method or by others embodying steps equivalent to those stated in the following claims.

I therefore particularly point out and distinctly claim as my invention:—

1. In apparatus of the character described, the combination of a belt supporting mechanism adapted to support a belt passing thereover, means adapted to distribute a binder over the surface of said belt, other means adapted to distribute abrasive over the binder on such surface, and means adapted to remove any abrasive and binder from the reverse surface of said belt.

2. In apparatus of the character described, the combination of a belt supporting mechanism, a binder delivery mechanism adapted to distribute binder uniformly over one surface of the belt on said supporting mechanism, means adapted to distribute abrasive material over the surface of such binder, and scraping means adapted to remove binder and abrasive from the reverse surface of such belt.

3. In apparatus of the character described, the combination of a belt supporting mechanism, means adapted to pass a perforated belt body over said supporting mechanism, means adapted to distribute a binder uniformly over the surface of said belt body, other means adapted to distribute abrasive material over the entire surface of said belt body, and scraping means adapted to remove binder and material working through the openings in said belt body onto the reverse surface of the same.

4. In apparatus of the character described, the combination of a washing tank, an endless carrier belt passing through said tank and adapted to support in a horizontal position a perforated belt body, means adapted to distribute a binder uniformly over the surface of said belt body, and means in said tank adapted to clean said belt of binder thereon.

5. In apparatus of the character described, the combination of a washing tank, an endless carrier belt passing through said tank and adapted to support in a horizontal position a perforated belt body, means adapted to distribute a binder uniformly over the surface of said belt body, and brushing means in said tank adapted to remove binder clinging to the outer surface of said belt body.

6. In apparatus of the character described, the combination of a washing tank, an endless carrier belt passing through said tank and adapted to support in a horizontal position a perforated belt body, means adapted to distribute a binder uniformly over the surface of said belt body, brushing means mounted in said tank beneath the level of the liquid therein, said means being adapted to remove binder clinging to the outer surface of said belt body, and other brushing means mounted above the level of the liquid in said tank, said means being adapted to clean said belt before the same again passes beneath said belt body.

7. In a liquid feeding mechanism, the combination of a liquid containing chamber provided with a discharge port in one side, a valve provided with a port registering in one position of said valve with such port in said chamber, a pivoted actuating element attached to said valve, and a threaded member engaging said element and adapted to position said valve to control the port from said chamber.

8. In a liquid feeding mechanism, the combination of a liquid containing chamber provided with a discharge port in one side, a valve provided with a port registering in one position of said valve with such port in said chamber, a pivoted actuating element attached to said valve, and a threaded adjusting element adjustably mounted in said chamber and extending exteriorly thereof for operation, said element engaging said actuating element and being adapted to position the same to control the position of said valve.

Signed by me, this 7th day of April, 1920.

ROBERT A. MOORE.